Patented Aug. 31, 1926.

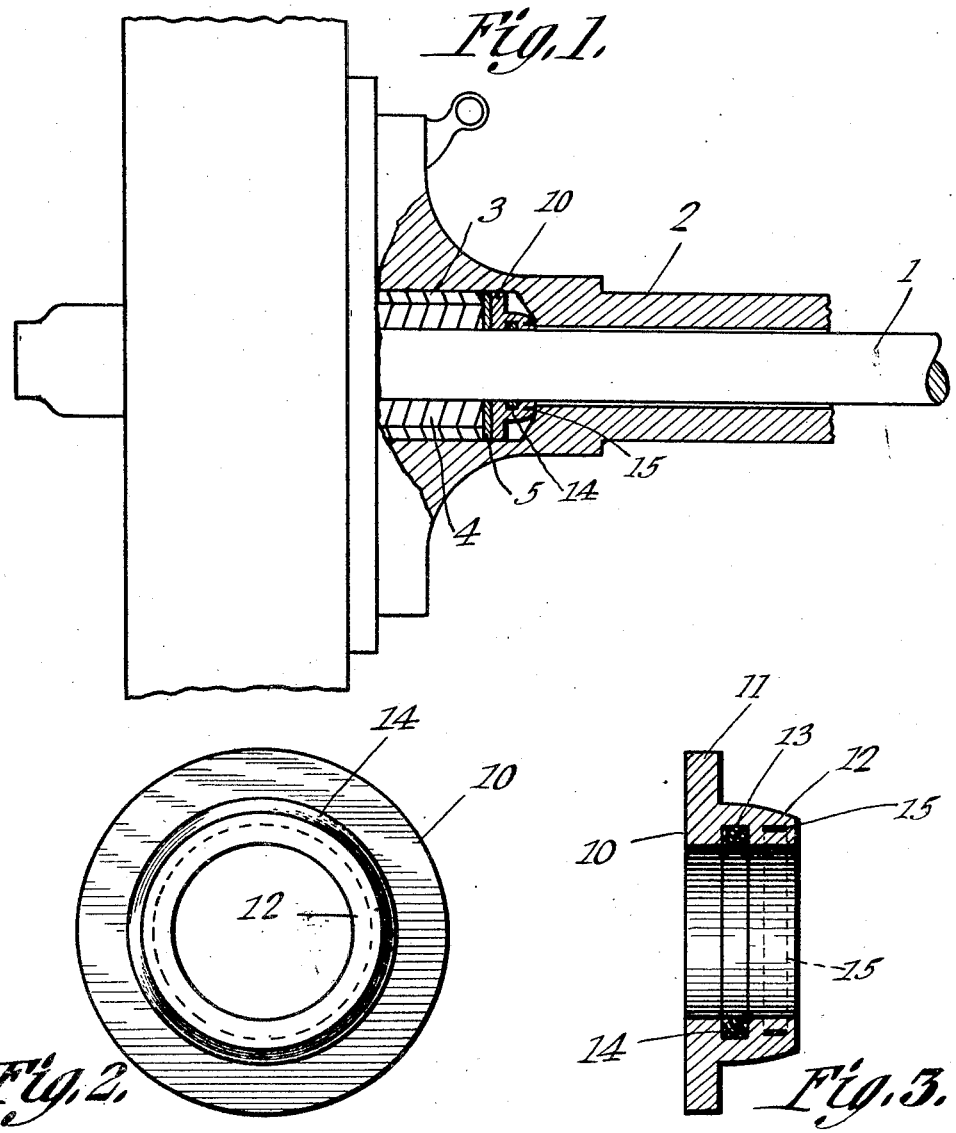

1,598,501

UNITED STATES PATENT OFFICE.

MILO A. PETERS AND JOHN J. STONER, OF CHARLESTON, WASHINGTON.

GREASE-RETAINING RING.

Application filed January 23, 1925. Serial No. 4,303.

This invention relates to grease traps for vehicles to prevent the grease from leaking from the rear assembly onto the wheels and tires.

The object of the invention is to so construct a grease retaining ring of this character which is simple and cheap to manufacture and yet will efficiently prevent grease from leaking out of the rear assembly of an automobile upon the wheels and tires.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section partly in side elevation of a wheel hub and the axle on which it is mounted showing this improved grease retaining ring applied;

Fig. 2 is an end elevational view of the device; and

Fig. 3 is a transverse vertical section of the grease retaining ring.

In the embodiment illustrated the axle 1 is shown mounted in the usual housing 2 and equipped at its inner edge with an axle housing including a sleeve 3 and roller bearings 4.

The grease retaining ring 10 constituting this invention comprises a lead washer having a cone-shaped tubular projection 12 on its front face and at its rear face equipped with a radially extending flange 11. The cone-shaped portion 12 has at its inner face intermediate its ends an annular groove 13 in which is designed to be mounted a small soft gasket 14 designed to absorb grease.

A metallic bushing 15 is cast in the outer end of the cone-shaped portion 12 of the washer 10 and is designed to fit the axle 1 snugly to prevent expanding of the washer by vibration of the axle.

This location of the lead grease retaining ring or washer 10 prevents all possibility of the grease from the rear assembly leaking out onto the wheels and tires and is a very much needed device in automobiles, more particularly in Ford cars.

We claim:—

1. A grease retaining ring comprising a washer-like body portion formed of lead material and having a cone-shaped projection formed on one face thereof, a metallic bushing embedded in the projection to cause the body portion to closely fit an axle on which the body portion is positioned, and said body portion having a groove to receive a gasket.

2. A grease retaining ring comprising a body portion formed of soft material and having a groove, a packing ring of soft material adapted to be fitted within the groove to closely engage the axle on which the body portion is positioned, a bushing formed of hard metal embedded in the body portion and said bushing adapted to prevent expansion of the body portion.

In testimony that we claim the foregoing as our own, we have hereto affixed our signatures.

MILO A. PETERS.
JOHN J. STONER.